United States Patent
Sinisalo

(10) Patent No.: US 7,356,373 B2
(45) Date of Patent: Apr. 8, 2008

(54) METHOD AND DEVICE FOR ENHANCING RING TONES IN MOBILE TERMINALS

(75) Inventor: Ari Sinisalo, Tampere (FI)

(73) Assignee: Nokia Corporation, Espoo (FI)

( * ) Notice: Subject to any disclaimer, the term of this patent is extended or adjusted under 35 U.S.C. 154(b) by 617 days.

(21) Appl. No.: 10/949,700

(22) Filed: Sep. 23, 2004

(65) Prior Publication Data

US 2006/0060069 A1    Mar. 23, 2006

(51) Int. Cl.
*H04M 1/00* (2006.01)

(52) U.S. Cl. .................... 700/94; 379/373.04
(58) Field of Classification Search .......... 379/373.04
See application file for complete search history.

(56) References Cited

U.S. PATENT DOCUMENTS 6,496,692 B1 * 12/2002 Shanahan ............... 455/418

* cited by examiner

*Primary Examiner*—Sinh Tran
*Assistant Examiner*—Walter F Briney, III
(74) *Attorney, Agent, or Firm*—Ware, Fressola, Van Der Sluys & Adolphson LLP

(57) ABSTRACT

A method and device for producing ring tones in high polyphony in real-time in a network component such as a mobile terminal or a server of a service provider. The network component has one or more ring tones in MIDI files of high polyphony, and a MIDI player of lower polyphony for producing sounds from the scaled down version of the MIDI files in real-time. In order to produce sounds indicative of the high-polyphony ring tones in real-time, the high-polyphony MIDI files are converted to compressed files in a non real-time manner. The converted files are stored in a storage so as to allow a compressed file player (such as Truetone, MP3, wav, AAC, RealAudio, Vorbis) to produce sounds from the converted files. A file lock is provided to the converted files so that they cannot be forwarded, thereby protecting the copyrights of the ring tone composer.

25 Claims, 6 Drawing Sheets

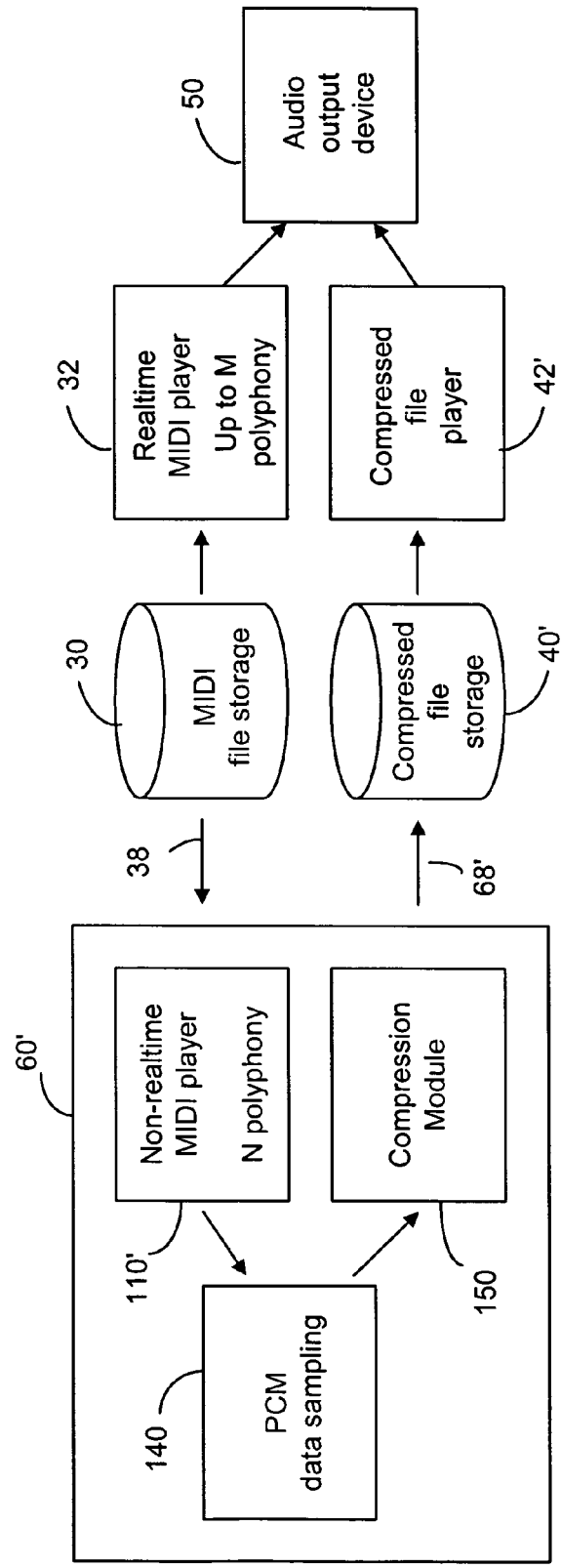

METHOD AND DEVICE FOR ENHANCING RING TONES IN MOBILE TERMINALS

FIELD OF THE INVENTION

The present invention relates to ring tone generation in mobile terminals or in the server of the service provider and, more particularly, to the use of Truetone or AAC (Advance Audio Coding) technology in such devices.

BACKGROUND OF THE INVENTION

Musical Instrument Digital Interface (MIDI) enables the creation polyphonic musical composition with a wide variety of different sounds. This means that multiple tones can be played at the same time using predefined instrument sounds such as piano, guitar, violin and drum. MIDI has been used in mobile terminals to generate ring tones, message alert tones and in games, background music and sound effects. In general, wavetable sound synthesis technology with sampled sounds from real instruments is used for MIDI sound synthesis. The quality of MIDI polyphony for ring tones depends largely on the number of sounds generated expressed as $2^n$ sound polyphony. For example, the sound quality of 64-sound polyphony is superior to that of 16 sound polyphony. In general, generating higher polyphony samples in real-time requires higher processing and computational power. That also means higher costs in manufacturing. In low-end and mid-end mobile terminals, the processing power is generally insufficient to generate high polyphony ring tones and message alert tones.

It is advantageous and desirable to enhance the ring tones and message alert tones in a mobile terminal or in a server where signal processing power is not enough to generate high MIDI polyphony samples in real-time.

Presently, Truetone technology is also used in mobile terminals for producing ring tones or other tones. As it is known in the art, Truetone technology makes it possible to use actual recorded sounds as ring tones and other tones. Truetone technology is based on the Adaptive Multi-rate Wideband (AMR-WB). ABR-WB represents state-of-the-art technology in low bit rate wideband speech coding. Like AMR, it is a multi-rate speech codec. AMR-WB technology uses nine-bit rates between 6.6 and 23.85 kbits/s at 16 kHz sampling rate. The speech processing is performed on 20 ms frames, so each AMR-WB encoded frame represents 320 speech samples. The technology has been optimized for a high-quality natural sound while still keeping the file sizes reasonably small. Small file size makes it possible to deliver the tones over the air making the purchase of Truetone ring tones similar to the purchase of MIDI ring tones. However, Truetone technology that is presently used in a mobile terminal or in a server of a service provider is meant to be a complementary technology to MIDI ring tone generation. It is also possible to use different compressed file formats like MP3, wav, AAC, RealAudio, Vorbis etc for ringing tone.

As shown in exemplary FIG. 1, a Truetone player is used, along with a MIDI player, in a mobile device.

SUMMARY OF THE INVENTION

The present invention makes use of compression components in a electronic device to generate tones and sounds from MIDI files. The network component has one or more ring tones in MIDI files of high polyphony, and a MIDI player of lower polyphony for producing sounds from the scaled down version of the MIDI files in real-time. In order to produce sounds indicative of the high-polyphony ring tones in real-time, the high-polyphony MIDI files are converted to compressed sample files in a non real-time manner. The compressed sample files are stored in storage so as to allow a compression file player to produce sounds from the compressed sample files. A file lock may be provided to the compressed sample files so that they cannot be forwarded, thereby protecting the copyrights of the ring tone composer.

Thus, the first aspect of the present invention provides a method for improving sound quality of synthesized tones produced on an audio producing component in an electronic device, the electronic device comprising:

a first player;

a first file storage for storing one or more data files so as to allow the first player to produce one or more tones for playing on an audio producing component, wherein the first player is capable of producing said tones based on said one or more data files in a real-time manner up to M-polyphony and wherein the tones so produced contain characteristics of a sound synthesizer, where M is a positive integer;

a different second player; and a second file storage for storing one or more recording files so as to allow the second player to produce sounds on the audio producing component in a real-time manner, wherein the sounds produced by the second player based on one or more recording files contain characteristics of a recorded sound. The method comprises:

converting at least one of said one or more data files for producing in a non real-time manner at least one converted file having a second player compatible format; and providing the converted file to the second player so as to produce sounds on the audio producing component in a real-time manner, wherein the sounds produced by the second player based on the converted file contain some characteristics of a sound synthesizer of N-polyphony, wherein N is a positive integer greater than M.

According to the present invention, the first player comprises a MIDI player, and the second player may comprise, but is not limited to: a Truetone player, an MP3 player, a wav player, an ADPCM player, a RealAudio, a Vorbis or an AAC player.

According to the present invention, the method further comprising the step of storing the converted file in the second file storage so as to allow the second player to produce sounds based on the converted file at a later time.

According to the present invention, the converting of files comprises converting audio signals to PCM samples, compressed samples, and packing compressed samples into frames.

The second aspect of the present invention provides an electronic device. The electronic device comprises:

a first player;

a first file storage for storing one or more data files so as to allow the first player to produce one or more tones for playing on an audio producing device, wherein the first player is capable of producing said tones based on said one or more data files in a real-time manner up to M-polyphony and wherein the tones so produced contain characteristics of a sound synthesizer, where M is a positive integer;

a different second player;

a second file storage for storing one or more recording files so as to allow the second player to produce sounds on the audio producing device in a real-time manner, wherein the sounds produced by the second player based on one or more recording files contain characteristics of a recorded sound;

a converter for converting at least one of said one or more data files for producing in a non real-time manner at least one converted file having a second player compatible format so as to allow the second player to produce sounds on the audio producing device in a real-time manner based on the converted file, wherein the sounds so produced contain some characteristics of a sound synthesizer of N-polyphony, wherein N is a positive integer greater than M.

According to the present invention, the first player comprises a MIDI player, and the second player may comprise, but is not limited to a Truetone player, an MP3 player, a wav player, an ADPCM player, an AAC player, a vorbis player or a RealAudio player.

According to the present invention, the electronic device comprises a mobile terminal or a server of a service provider.

According to the present invention, the sounds produced based on the converted file comprises a ring tone or a message alert tone.

According to the present invention, the electronic device further comprises:

means for accessing an external storage medium for downloading further data files from the storage medium.

According to the present invention, at least one of the data files are copyright protected and wherein the converted files converted from said at least one data file is provided with a file lock so that said converted files are also copyright protected.

According to the present invention, the data files are scalable so as to allow the first player to produce the tones based on the scaled data files in a real-time manner.

The third aspect of the present invention provides a software program product for use in an electronic device in which a software code for converting an audio file is stored, the electronic device comprising the following components:

a MIDI player;

a MIDI file storage for storing one or more MIDI files so as to allow the MIDI player to produce one or more tones for playing on an audio producing device, wherein the MIDI player is capable of producing said tones based on one or more MIDI files in a real-time manner up to M-polyphony and wherein the tones so produced contain characteristics of a sound synthesizer, where M is a positive integer;

a compressed file player;

a compressed file storage for storing one or more compressed sample files so as to allow the compressed file player to produce sounds on the audio producing device in a real-time manner, wherein the sounds produced by the compressed file player based on one or more compressed sample files contain characteristics of a recorded sound. The software program comprises a software code for realizing the following steps when running in one or more of the components of the electronic device:

converting at least one of said one or more MIDI files to a converted file in a compressed file player compatible format; and outputting the converted file so as to allow the compressed file player to produce sounds on the audio producing device in a real-time manner based on the converted file, wherein the sounds so produced contain some characteristics of a sound synthesizer of N-polyphony, wherein N is a positive integer greater than M.

The fourth aspect of the present invention provides a file conversion module for use in an electronic device, the electronic device comprising:

a first player; and a different second player. The file conversion module comprises:

a first file storage for storing one or more data files, wherein the data files can be used by the first player to produce one or more tones to be played on the audio producing component in a real-time manner up to M-polyphony, and wherein the tones so produced contain characteristics of a sound synthesizer and M is a positive integer;

a second file storage for storing one or more recording files, wherein the recording files can be used by the second player to produce sounds on the audio producing component in a real-time manner, and wherein the sounds produced by the second player contain characteristics of a recorded sound; and a converter for converting at least one of said one or more data files for producing in a non real-time manner at least one converted file having a second player compatible format so as to allow the second player to produce sounds on the audio producing component in a real-time manner based on the converted file, wherein the sounds so produced contain some characteristics of a sound synthesizer of N-polyphony, wherein N is a positive integer greater than M.

According to the present invention, the converter comprises a MIDI generator, a PCM sampling module, and a compression module.

According to the present invention, the converter provides audio data in the converting, and the module further comprises:

a frame packing device, operatively connected to the converter, for packing the audio data into frames.

The present invention will become apparent upon reading the description taken in conjunction with FIGS. 2 to 8.

BRIEF DESCRIPTION OF THE DRAWINGS

FIG. 6 is a schematic representation illustrating a server of a service provider that uses the sound enhancement method and device, according to the present invention.

FIG. 7 is flowchart showing various steps in MIDI to compressed sample file conversion.

FIG. 8 is a block diagram illustrating a general converter for converting MIDI files to compressed sample files.

DETAILED DESCRIPTION OF THE EXEMPLARY EMBODIMENT

Figure 1:
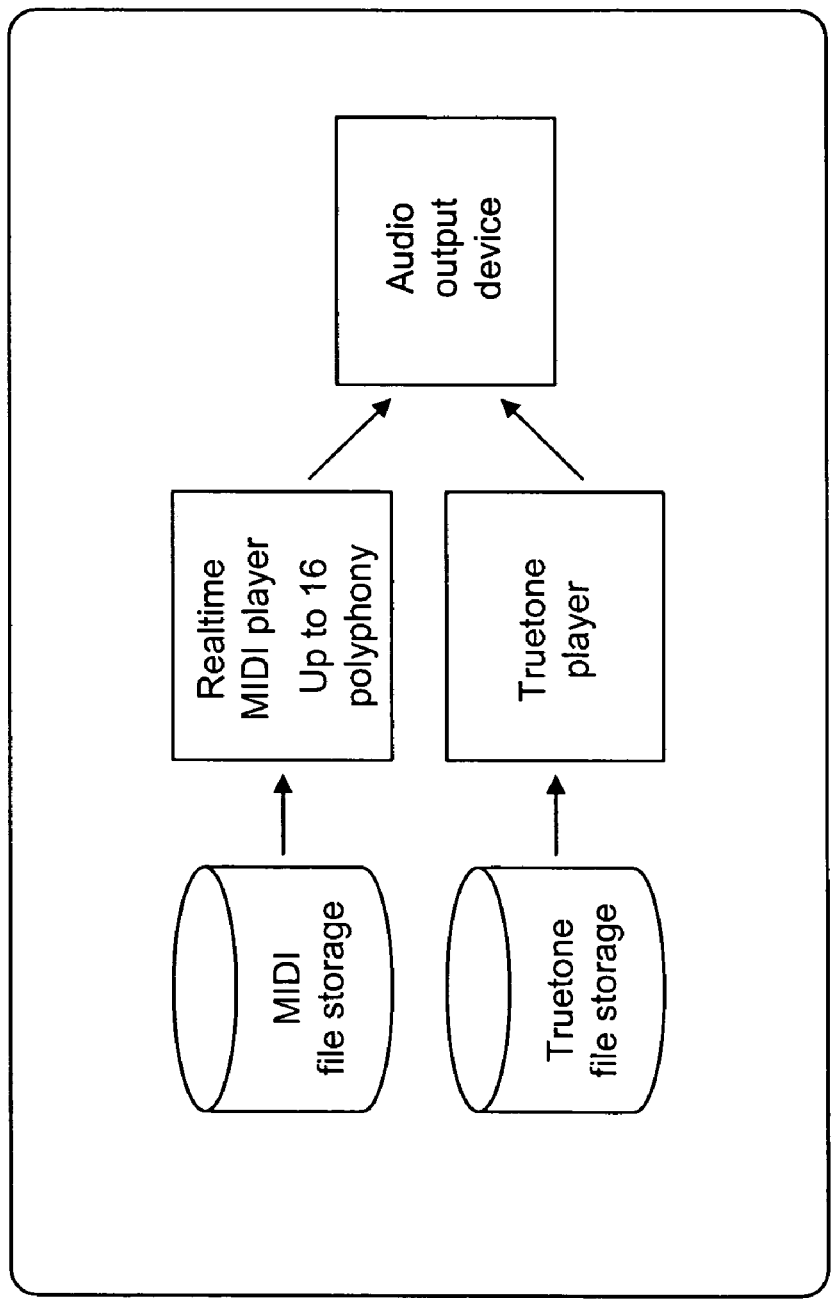
FIG. 1 is a block diagram illustrating the use of Truetone technology along with MIDI technology in prior art.

According to one embodiment of the present invention, Truetone components in a mobile terminal are used to generate tones and sounds from MIDI files. It should be noted that MIDI technology is based on sound synthesis based on a wavetable having sampled sounds from real instruments, for example. Truetone technology is based on actually recorded sounds, such as human voices and animal sounds, for example. As shown in FIG. 1, the MIDI player synthesizes ring tones or other tones using stored MIDI files in a storage medium. The Truetone player retrieves recorded sounds from a Truetone file storage. While both players use the same audio output device, they are unrelated. While Truetone technology is suitable for real-time sound producing applications, low MIDI polyphony components may not be adequate for such real-time applications.

Figure 2:
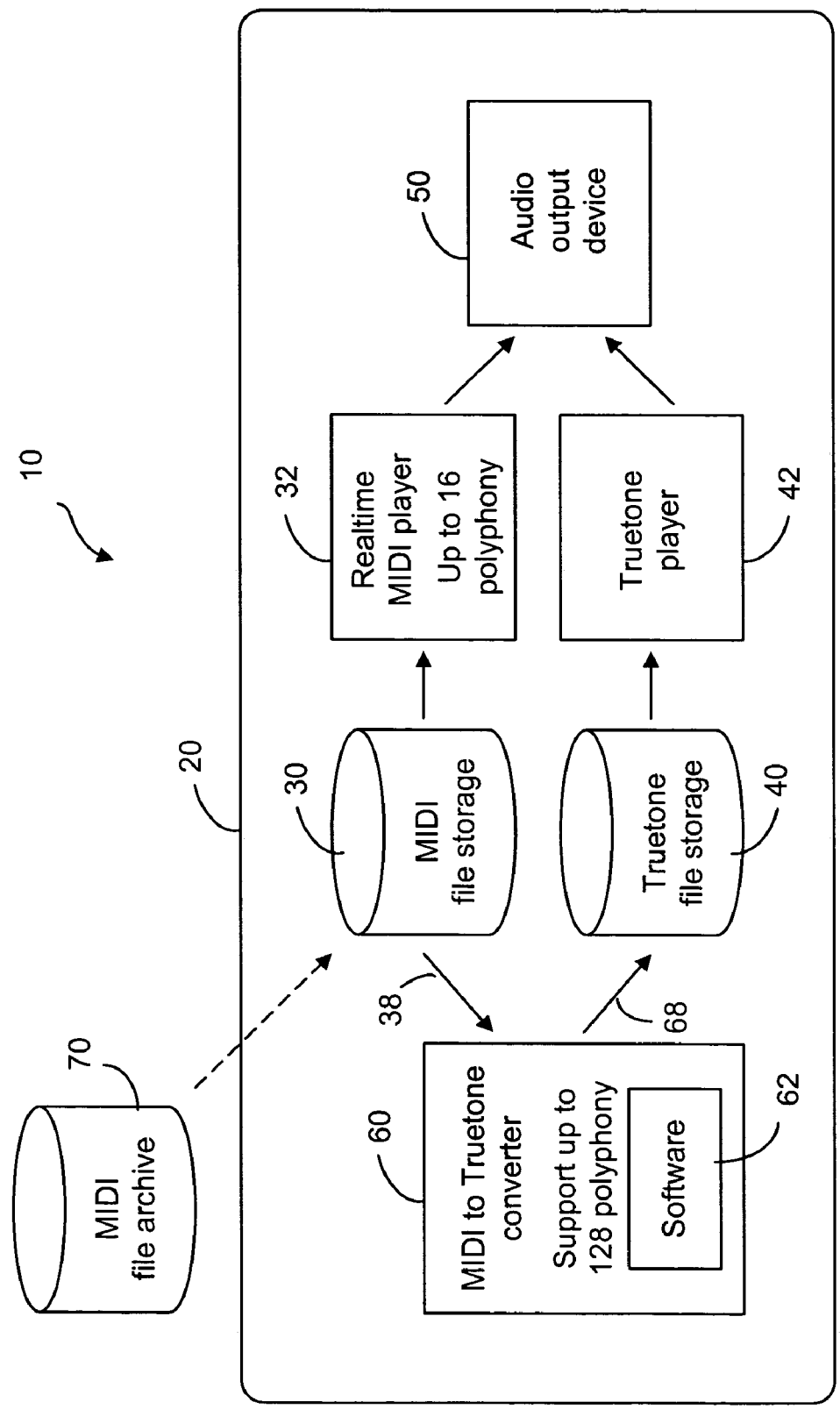
FIG. 2 is a block diagram illustrating the use of Truetone technology for generating real-time tone samples, according to one embodiment of the present invention.

The present invention takes advantage of the existing Truetone components in a communications device so the MIDI sounds can also be produced in a low-end or mid-end mobile terminal where MIDI components are not adequate for real-time ring tone generation, for example. As shown in FIG. 2, a communications network component 10, such as a mobile terminal or a server of a service provider, comprises a sound producing part 20. The sound producing part 20 comprises a MIDI file storage 30 containing one or more MIDI files for producing ring tones or other tones, and a real-time MIDI player 32, which can synthesize MIDI tones up to 16 polyphony in real-time using the stored MIDI files. However, the MIDI player 32 is not adequate in synthesizing MIDI 64 sound polyphony in real-time, for example. The sound producing part 20 also comprises a Truetone file storage 40 to store pre-recorded sounds and a Truetone player 42 to produce the recorded sounds. Both players 32, 42 share a common audio output device 50. However, in order to produce high quality sound in real-time, the present invention uses a MIDI-to-Truetone converter 60 to convert MIDI files 38 to Truetone files 68 and stores the converted files in the Truetone file storage 40. For example, if the converter 60 can support up to 128 polyphony, the sounds produced from the converted files by the Truetone player 42 in real-time would be similar to that of MIDI 128 polyphony. Thus, a communication device 10 having a MIDI player for 16 polyphony can produce MIDI-like sounds of 128 polyphony. This is especially beneficial in the case of low-end or mid-end mobile terminals wherein the computational and processing power is insufficient to synthesize MIDI sounds of very large number of polyphony. Furthermore, in a mobile terminal that is equipped with a MIDI player, the mobile terminal is made compatible with existing vast MIDI ring tone libraries. For example, the sound producing part 20 can be operatively linked to a MIDI archive 70 for transferring therefrom additional MIDI files if so desired. The conversion from MIDI to Truetone can be carried out by a software program 62 associated with the converter 60. For example, the software program 62 has a code for retrieving or receiving a MIDI file 38 from the storage 30, a code for the MIDI-Truetone conversion, and a code for conveying the converted file 68 to the storage 40. It should be noted that it is desirable and advantageous that the MIDI files are scalable in that a user of the mobile phone is able to use the MIDI player 32 to listen a scaled down version of MIDI high polyphony tones. As such, the user can browse (listen to) the MIDI ring tones in the mobile phone in real-time without the conversion from MIDI to Truetone. It is known that Digital Rights Management (DRM) information may be attached to the content of downloadable MIDI files in order to prevent unauthorized copying, distributing, etc., of the downloaded files. In conversion, however, the DRM information is lost. As a consequence, the Truetone files that are converted from the copyright-protected MIDI files are no longer protected by the DRM information. It is possible to provide a code in the converted and compressed files as a lock so that these files cannot be forwarded in order to protect the copyrights of the MIDI ring tone provider.

Figure 3:
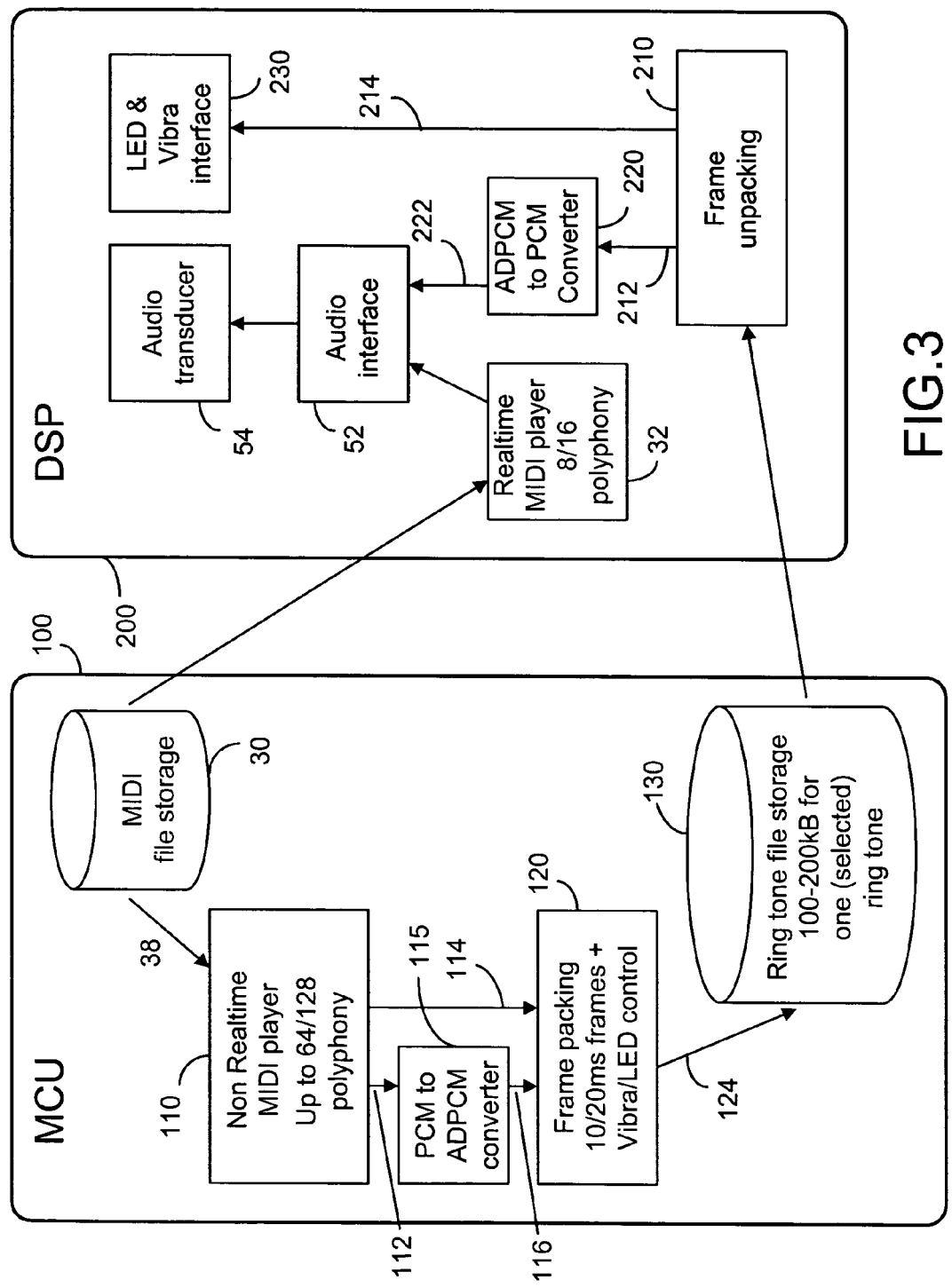
FIG. 3 is a block diagram illustrating the processing of sounds in a communications device, according to another embodiment of the present invention.

Furthermore, the control signals for LEDs and Vibra can be generated from the original MIDI files in the conversion phase. LEDs are used to provide a visual effect of a ring tone, and Vibra is a "ringing" mode that causes the device to vibrate. The control signals may be, but are not limited to on/off type signals that turn the LED display or the vibrator on and off according to the played MIDI tone. FIG. 3 is a block diagram showing the components used in generating and using the control signals in the conversion phase, according to another embodiment of the present invention. As shown in FIG. 3, a MIDI control unit (MCU) 100 and a digital signal processor (DSP) 200 are used to convert MIDI files to LED and Vibra control signals. In the MCU 100, a non real-time MIDI player 110 is operatively connected to the MIDI file storage 30 for retrieving MIDI files therefrom. The non real-time player 110 can support up to 64 or 128 polyphony, for example. In this embodiment 16 bit 16 kHz PCM samples 112 are compressed by an ADPCM (adaptive delta pulse code modulation) module 115 at a rate of 32 kB/s, and an ADPCM stream 116 is provided to a frame-packing device 120. At the same time, Vibra and LED control side-information 114 may be provided to the frame-packing device 120 directly from the non real-time MIDI player 110. The packed 10/20 ms frames and the Vibra/LED control signal 124 are stored in a ring tone file storage 130. When the packed frames and the control signal are used, they can be retrieved from the storage 130 and conveyed to the DSP 200. In the DSP 200, a frame-unpacking device 210 is used to unpack the packed frames. The unpacked frames 212 are provided to an ADPCM-PCM converter 220 for producing PCM streams 222. The audio interface 52 and an audio transducer 54 can be a part of the audio output device 50, as shown in FIG. 2. At the same time, LED and Vibra control signal 214 is provided to an LED and Vibra interface 230 to produce the desired effects.

Figure 4:
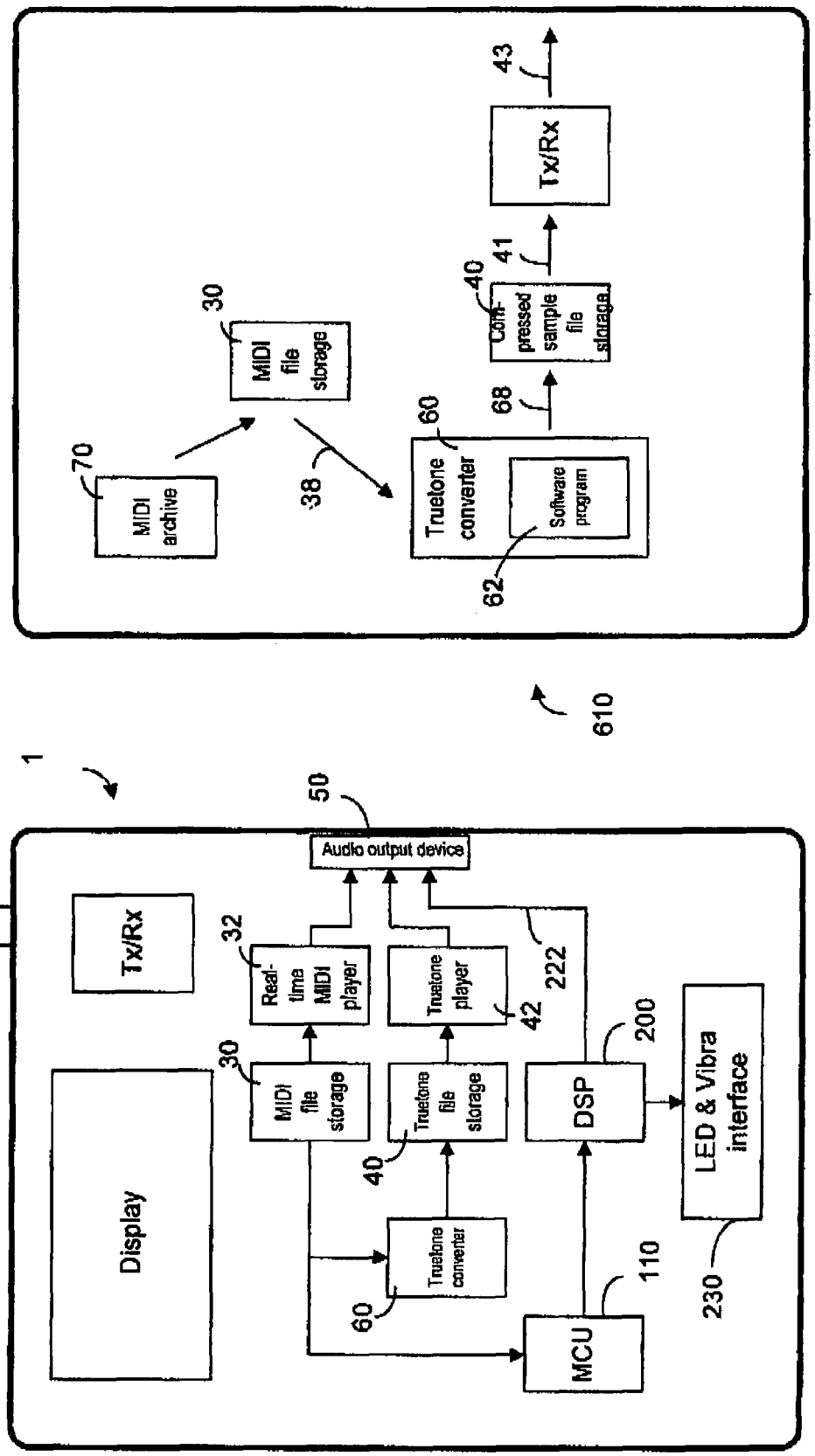
FIG. 4 is a schematic representation illustrating a mobile terminal that uses the sound enhancement method and device, according to the present invention.

The advantages of the present invention include that a mobile phone having low computational and signal processing power can provide MIDI-like ring tones at a high number polyphony in real-time based on MIDI files without using a MIDI player that can support a high number polyphony. FIG. 4 is a schematic representation illustrates such a mobile terminal. As shown, the mobile terminal 1 comprises a plurality of sound producing components such as an audio output device 50, a real-time MIDI player 32, a MIDI file storage 30, a Truetone player 42, a Truetone file storage 40, and a MIDI to Truetone converter 60. Furthermore, the mobile terminal 1 may also comprise some of the components in the MCU 100 and DSP 200 to generate Vibra and LED control signals and effects. It is known that the mobile terminal 1 also has a Tx/Rx front-end for transmitting and receiving RF signals.

Figure 5:
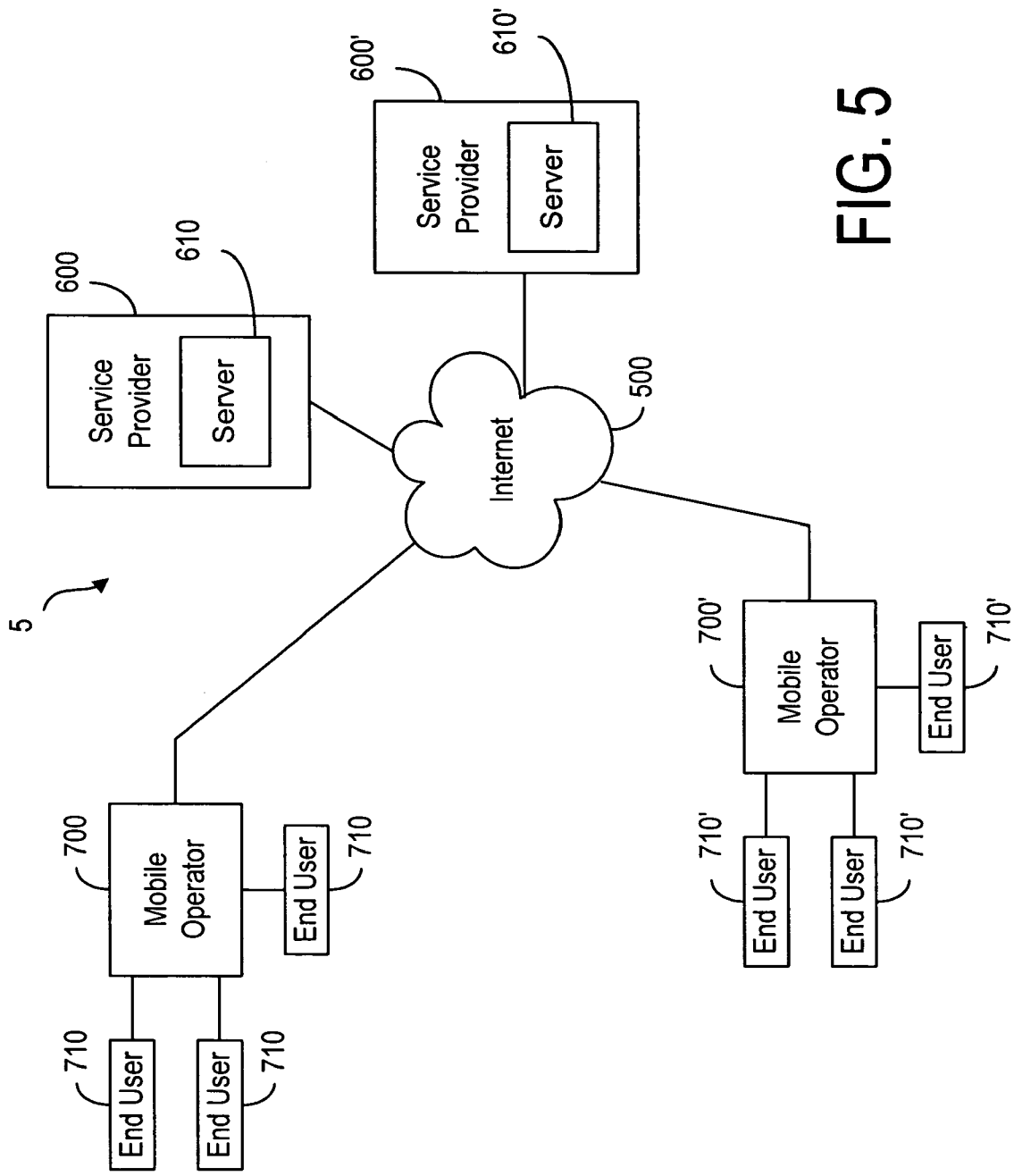
FIG. 5 is a schematic representation illustrating a communications network having a server of a service provider that uses the sound enhancement method and device, according to the present invention.

It should be noted that ring tones can also be downloaded to a mobile terminal from a service provider of a communications network, as shown in FIG. 5. As shown in FIG. 5, the communications system 5 comprises a plurality of service providers 600 and a plurality of mobile operators 700. The service providers 600 can provide data services, for example. The service providers 600 can also provide ring tones, through their servers 610, to allow an end user 710 of a mobile operator 700 to purchase one or more ring tones through the Internet 500, for example. It is possible that the server 610 is equipped with the necessary components for MIDI to compressed sample file conversion so as to allow the end user 710 to obtain ring tones in a Truetone format instead of MIDI format. As shown in FIG. 6, the server 610 of a service provider comprises a MIDI file storage 30 for storing a plurality of MIDI ring tone data files 38. The MIDI data files 38 can be converted into ring tones in the Truetone format by a software program 62 in a MIDI-to-compressed sample file converter 60. The converted files 68 can be stored in a compressed sample file storage 40 so that one or more stored Truetone files 41 can be incorporated into a bitstream 43 for transmission by a transceiver.

The present invention has been disclosed in reference to MIDI to Truetone and ADPCM conversion of ring tones in a mobile terminal or a server of a service provider. It is should be noted that the mobile terminal and the server are only examples of network components in a communications network. More generally, the present invention provides a method and device for the conversion of data files for sound synthesis to recording-like files so that the converted files can be played in real-time, wherein the recording-like files can be played in real-time with higher polyphony than the number of polyphony that can be synthesized from the data files in real-time.

In general, MIDI file to compressed sample file conversion involves in a number of steps, as shown in FIG. 7. As shown in FIG. 7, a non-realtime MIDI (high polyphony) is used to generate synthesized signals from MIDI files. The synthesized signals are then converted to PCM samples. In the compression stage, any one of the compression modules (Truetone, ADPCM, wav, MP3, RealAudio, Vorbis, AAC and the like) can be used to compress the PCM samples into compressed sample files. Similarly, a converter which is used to convert MIDI files into compressed sample files comprises a number of components or modules. As shown in FIG. 8, the converter 60' comprises a non-realtime MIDI player (N polyphony) 110' for generating synthesized signals, a sample module 140 for providing raw PCM samples from the synthesized signals, and a compression module 150 for compressing the PCM samples into compressed data files 68'. The compression module can be, but is not limited to, a Truetone player, an ADPCM converter, a wav player, an MP3 player, a RealAudio player, a Vorbis player, an AAC player or the like.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for improving sound quality of synthesized tones produced on an audio producing component in an electronic device, the electronic device comprising:
    a first player;
    a first file storage for storing one or more data files so as to allow the first player to produce one or more tones for playing on the audio producing component, wherein the first player is capable of producing said tones based on said one or more data files in a real-time manner up to M-polyphony and wherein the tones so produced contain characteristics of a sound synthesizer, where M is a positive integer;
    a different second player; and
    a second file storage for storing one or more recording files so as to allow the second player to produce sounds on the audio producing component in a real-time manner, wherein the sounds produced by the second player based on one or more recording files contain characteristics of a recorded sound, said method comprising:
    converting at least one of said one or more data files for producing in a non real-time manner at least one converted file having a second player compatible format; and
    providing the converted file to the second player so as to produce sounds on the audio producing component in a real-time manner, wherein the sounds produced by the second player based on the converted file contain some characteristics of a sound synthesizer of N-polyphony, wherein N is a positive integer greater than M.

2. The method of claim 1, wherein the first player comprises a MIDI player.

3. The method of claim 1, wherein the second player comprises a Truetone player.

4. The method of claim 1, wherein the second player comprises an AAC player.

5. The method of claim 1, wherein at least some of the data files are copyright protected and wherein the converted files converted from the at least some data files are provided with a file lock.

6. The method of claim 1 further comprising
    storing the converted file in the second file storage so as to allow the second player to produce sounds based on the converted file at a later time.

7. The method of claim 1, wherein said converting further comprises packing audio signals into frames.

8. The method of claim 1, further comprising
    providing LED and Vibra control signals.

9. An electronic device, comprising:
    a first player;
    a first file storage for storing one or more data files so as to allow the first player to produce one or more tones for playing on an audio producing device, wherein the first player is capable of producing said tones based on said one or more data files in a real-time manner up to M-polyphony and wherein the tones so produced contain characteristics of a sound synthesizer, where M is a positive integer;
    a different second player;
    a second file storage for storing one or more recording files so as to allow the second player to produce sounds on the audio producing device in a real-time manner, wherein the sounds produced by the second player based on one or more recording files contain characteristics of a recorded sound;
    a converter for converting at least one of said one or more data files for producing in a non real-time manner at least one converted file having a second player compatible format so as to allow the second player to produce sounds on the audio producing device in a real-time manner based on the converted file, wherein the sounds so produced contain some characteristics of a sound synthesizer of N-polyphony, wherein N is a positive integer greater than M.

10. The electronic device of claim 9, wherein the first player comprises a MIDI player.

11. The electronic device of claim 9, wherein the second player comprises a Truetone player.

12. The electronic device of claim 9, wherein the second player comprises an AAC player.

13. The electronic device of claim 9, comprising a mobile terminal.

14. The electronic device of claim 9, comprising a network element.

15. The electronic device of claim 9, wherein the sounds produced based on the converted file comprise a ring tone.

16. The electronic device of claim 9, wherein the sounds produced based on the converted file comprise a message alert tone.

17. The electronic device of claim 9, further comprising:
means for accessing an external storage medium for downloading further data files from the storage medium.

18. The electronic device of claim 9, wherein at least some of the data files are copyright protected and wherein the converted files converted from said at least some data files are provided with a file lock so that said converted files are also copyright protected.

19. The electronic device of claim 9, wherein the data files are scalable so as to allow the first player to produce the tones based on the scaled data files in a real-time manner.

20. A file conversion module for use in an electronic device, the electronic device comprising:
a first player; and
a different second player, a file conversion module comprising:
a first file storage for storing one or more data files, wherein the data files can be used by the first player to produce one or more tones to be played on an audio producing component in a real-time manner up to M-polyphony, and wherein the tones so produced contain characteristics of a sound synthesizer and M is a positive integer;
a second file storage for storing one or more recording files, wherein the recording files can be used by the second player to produce sounds on the audio producing component in a real-time manner, and wherein the sounds produced by the second player contain characteristics of a recorded sound; and
a converter for converting at least one of said one or more data files for producing in a non real-time manner at least one converted file having a second player compatible format so as to allow the second player to produce sounds on the audio producing component in a real-time manner based on the converted file, wherein the sounds so produced contain some characteristics of a sound synthesizer of N-polyphony, wherein N is a positive integer greater than M.

21. The file conversion module of claim 20, wherein the converter comprises a PCM to ADPCM converter.

22. The file conversion module of claim 20, wherein the converter provides audio signals in said converting, the module further comprising:
a frame packing device, operatively connected to the converter, for packing the audio signal into frames.

23. The file conversion module of claim 20, wherein the converter is operatively connected to a first player for receiving compressed samples for converting PCM signals to ADPCM signals.

24. The file conversion module of claim 22, wherein the frame packing device is also operatively connected to the first player for receiving signals therefrom in order to produce a visual effect based on said one or more tones.

25. The file conversion module of claim 22, wherein the frame packing device is also operatively connected to the first player for receiving signals therefrom in order to produce a vibration signal based on said one or more tones.

* * * * *